United States Patent [19]

Sidebotham et al.

[11] 4,003,880

[45] Jan. 18, 1977

[54] FABRIC DYE STRIPPING, SEPARATION AND RECOVERY OF POLYESTER

[75] Inventors: Norman C. Sidebotham, Decatur, Ala.; Paul D. Shoemaker; Clarence W. Young, III, both of Pensacola, Fla.

[73] Assignee: Monsanto Company, St. Louis, Mo.

[22] Filed: May 19, 1975

[21] Appl. No.: 578,592

[52] U.S. Cl. .............................. 260/75 T; 264/37; 264/49; 264/344
[51] Int. Cl.² .................. C08G 63/70; D06M 9/00
[58] Field of Search ............ 260/75 T, 2.3; 264/37, 264/49, 344

[56] References Cited

UNITED STATES PATENTS

| | | | |
|---|---|---|---|
| 2,337,928 | 12/1943 | Reichel | 264/37 |
| 2,938,811 | 5/1960 | Hermes | 260/75 T X |
| 3,132,194 | 5/1964 | Edmonds et al. | 264/37 |
| 3,159,964 | 12/1964 | Kretsch | 260/75 T |
| 3,716,614 | 2/1973 | Okamoto et al. | 264/344 |
| 3,758,457 | 9/1973 | Broeck et al. | 264/37 |
| 3,943,105 | 3/1976 | Hermes | 260/75 T X |

*Primary Examiner*—Lucille M. Phynes
*Attorney, Agent, or Firm*—Thomas Y. Awalt, Jr.

[57] ABSTRACT

Polyester polymer is recovered from mixed collections of fibers in the form of fibers, filaments, or fabrics (including dyed or undyed fibers other than polyester fibers as well as dyed polyester fibers) and used in the production of new undyed fibers, films and other polymer products through the process of stripping the dye from the polyester fibers by contacting the fabrics with a dye stripping solvent for polyester polymer which is preferably not a solvent for fibers other than polyester fibers at a temperature below which the polyester fibers dissolve and above which the crystalline lattice of the polyester fibers swell so as to release the dye; then removing essentially all of the dye-containing dye-stripping solvent which is not absorbed by the fibers; then contacting the solvent-laden fibers (which may contain residual dye) with sufficient additional solvent under selective dissolution conditions for polyester fibers; then removing the undissolved fibers and any other undissolved impurities from the solution; thereafter precipitating the polyester out of; and, separating the polyester from the solution.

29 Claims, 1 Drawing Figure

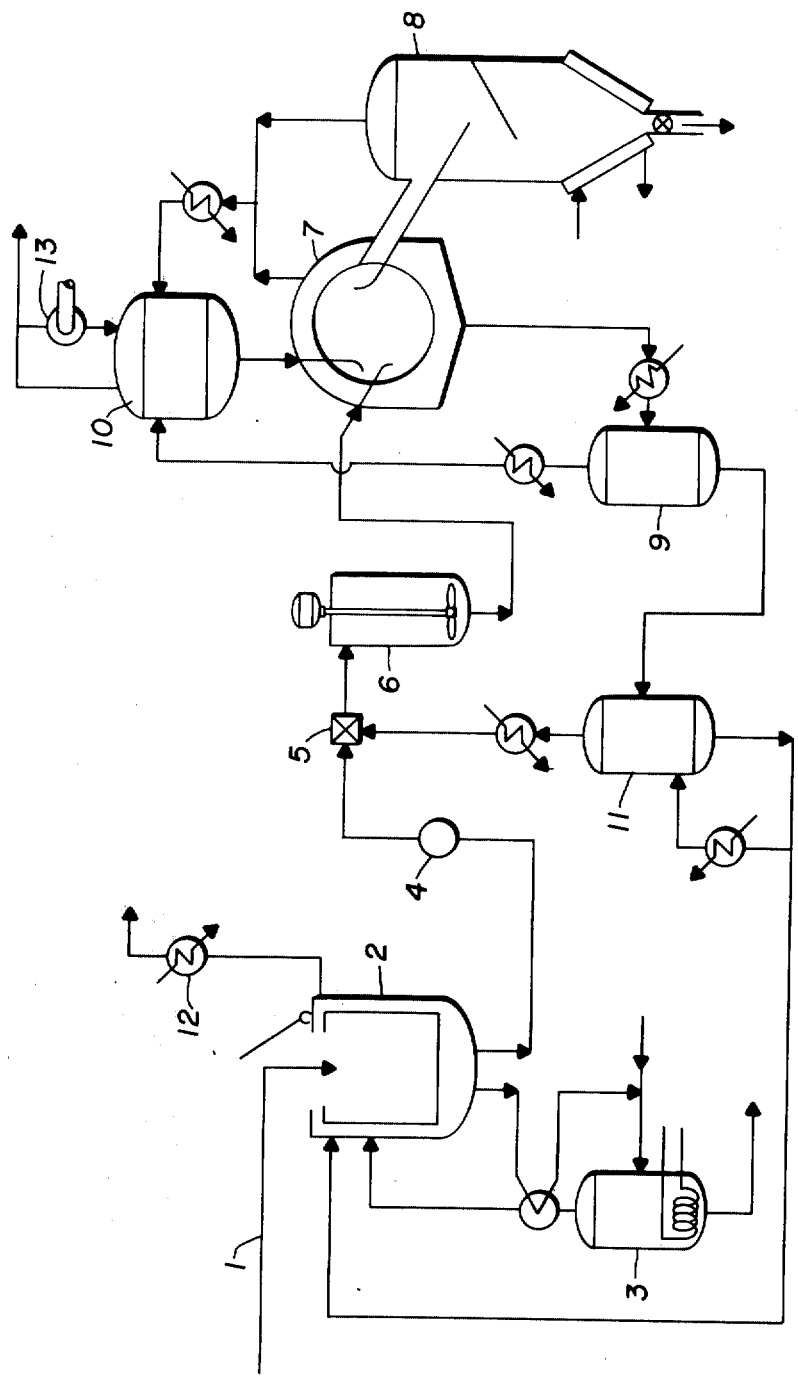

FABRIC DYE STRIPPING, SEPARATION AND RECOVERY OF POLYESTER

BACKGROUND OF THE INVENTION

1. Field of the Invention

The invention relates to a process for selectively recovering thermoplastic polymers, and particularly polyester polymers from collections of yarns, films, fibers or fabrics, including dyed polyester fibers, for use in production of new undyed thermoplastic products, particularly polyester fibers, films and the like. More specifically, the invention relates to a process for selectively recovering polyester polymer by means of stripping the dye from dyed polyester fibers, subsequently dissolving the polyester fibers, separating the solution from any insoluble materials, and thereafter precipitating out the polyester polymer for reuse.

2. Prior Art

The consumption of thermoplastic polymers is greater than ten billion pounds per year. Some, such as polyethylene, polypropylene, polyvinylchloride, polystyrene, polyamides and polyester, surpass the billion pounds per year rate. The use of many of these relatively expensive thermoplastic polymers in synthetic fibers has also increased tremendously. It has been estimated that the world's consumption of synthetic fibers will reach some 12 million metric tons (26 billion pounds) by the year 1980, of which 4.6 million metric tons would constitute polyester fibers, 4.1 million metric tons would be polyamide fibers and 2.3 million metric tons will be polyacrylic fibers (*Chemical and Engineering News*, Feb. 2, 1970, p. 22).

Concomitantly the world is facing a shortage of raw materials for thermoplastic polymers; and sophisticated and efficient methods of recycling are needed.

Various methods have been described in the prior art for the recovery of thermoplastic polymers, including polyester polymers, from scrap polymer; and these include the dissolution of the polymer in various solvents; thereafter precipitating and recovering the polymer. The objects of such processes were to avoid polymer degradation and/or to separate from the usable polymer the degraded polymer and/or monomers as impurities. These processes were slow and expensive; suitable only for laboratory usage; moreover, they neither addressed themselves to nor did they solve fiber separation and dye removal problems.

Waste fibers, films, yarns and fabrics have been garnetted and reprocessed for various uses including the manufacture of yarn and fabrics.

A recent U.S. patent application discloses a generic concept for separation of collections of yarns and fabrics through solvent schemes, for successive dissolution of various constituents, and for recovery of polymers, but these were not specific to polyester recovery or to dyed polyester in the starting material and the speculatively described processes were slow, inefficient, expensive and therefor commercially impractical.

Neither the prior art fabric recovery processes nor the polymer recovery processes have provided for efficient dye stripping as well as fiber separation in conjunction with polymer recovery, and most have not addressed the problem.

It will thus be recognized that a satisfactory and efficient process for recovery of polyester polymer from collections of dyed fibers or fabrics also comprising cellulosic fibers and/or other man-made fibers, would be a meritorious advance in the art. It would substantially reduce the raw material requirement for the world's largest fiber market.

SUMMARY OF THE INVENTION

In accordance with the present invention, a totally new process is provided whereby dye-stripping, separation and polymer recovery are combined in such a manner that the dye-stripping phase actually constitutes the first step of the dissolution and separation phase in that after completion of the so-called "dye-stripping" phase the fibers remain saturated with a dye-stripping solvent which serves as part of the solvent used for dissolution of the polyester, so that only one solvent system may be employed. Moreover, the dissolution of the polyester and its subsequent precipitation and separation from the solvent serves to complete the dye removal, as well as separation and recovery of the polymer.

Briefly, the inventive concept is a process for selectively recovering polyester polymer from collections of dyed fibers or fabrics including dyed polyester fibers, comprising:

1. contacting collections of yarns, films, fibers, or fabrics, including dyed polyester fibers with a dye-stripping solvent for polyester polymer which is preferably not a solvent for the remaining constituents at a temperature below which the polyester fibers dissolve and above which the crystalline lattice of the polyester fibers swell so as to release the dye, thereby stripping the dye from the polyester fibers;

2. then removing the excess of the dye-containing dye-stripping solvent which is not absorbed by the fibers and fabrics;

3. then contacting the fibers (which may contain residual dye and dye-stripping solvent) with sufficient addition of a primary dissolution solvent under selective dissolution conditions for polyester fibers;

4. then removing the undissolved fibers or other solid impurities from the solution;

5. thereafter precipitating the polyester out of; and, 6. separating it from the solution.

It is an advantage of this invention that the same solvent or solvent system may be used for both dye-stripping and polymer recovery, as well as for fiber separation.

It is another advantage of this invention that removal of solvent from recovered polyester is greatly simplified.

It is yet another advantage of this invention that preferred solvent systems are employed efficiently and rapidly in the selective recovery process.

BRIEF DESCRIPTION OF THE DRAWING

The drawing schematically illustrates by means of a flow diagram a typical arrangement in accordance with the present invention.

DESCRIPTION OF THE PREFERRED EMBODIMENTS

For the purposes of this description, solvents will be classified as "dye-stripping solvents" and "primary dissolution solvents". A "dye-stripping solvent", as used herein, is any solvent which swells the crystalline structure of the polyester fiber, at the same time dissolving and thereby removing conventional dyes and finishes. It is selective in nature in the sense that it will dissolve a minimum, if any, of polyester and preferably will neither dissolve nor swell other components in the starting collection of materials. A "primary dissolution solvent" is a solvent whose primary function in the course of this invention is to dissolve the polyester. It should have the characteristic of dissolving a significant amount of polyester, selectively with respect to other components in the starting material, at moderate temperatures, all the while permitting precipitation at a later stage at another reasonably identifiable temperature. All presently known "primary dissolution solvents" are also "dye-stripping" solvents (employed at lower temperatures and or lower concentrations), but the converse is not necessarily true. Of course it is preferred, according to this invention, that the dye-stripping solvent and the primary dissolution solvent be the same, and such identity is one aspect of this invention. If identical solvents are not used, it is desirable that they be compatible in the sense that they do not functionally interfere with one another and that they be readily separable or functionally interchangeable as this will permit a much more simplified recovery system.

It is also preferred that the solvents employed in this invention do not significantly degrade or depolymerize the polyester. In addition, the solvent should have the characteristic of being essentially a nonsolvent for the other components in a collection of yarns, films, fibers, fabrics, etc., if such a collection is employed as the starting material. Of course, whenever solvents or quenching media are used together they should be compatible in the sense that they do not explode or react violently. ["Quenching" and "quenching media" are discussed below.]

dye removal and dissolution include para-chloroanisole; nitrobenzene; acetophenone; propylene carbonate; dimethyl sulfoxide; 2,6 xylenol; quinoline; trifluoroacetic acid; ortho-chlorophenol; trichlorophenol; and mixtures of trichloroethane and phenol; trichloroacetic acid and dichloromethane; trichloroacetic acid and 1,1,1 trichloroethane; trichloroacetic acid and water; trichlorophenol and phenol; 1,1,2,2 tetrachloroethane and phenol; 1,1,2 trichloro 1,2,2 trifluoroethane and 1,1,1,3,3,3 hexafluoro-isopropanol. Other known polyester solvents and solvent systems which are useful include compounds having at least one and more commonly two or more condensed rings in their structure such as diphenyl, diphenyl ether, naphthalene, methylnaphthalene, benzophenone, diphenylmethane, para-dichlorobenzene, acenaphthene, phenanthrene and similar compounds. Naphthalene has been found especially suitable for the practice of this invention for dye-stripping and as a primary dissolution solvent because the solubility of polyester in naphthalene is a strong function of temperature, ranging from 0 solubility at 170° C to about 55 percent polyester solubility at 218° C (boiling point of naphthalene). Naphthalene is also highly selective in the sense that although minor amounts of nylon 66(<0.1%) may dissolve, it will not, at up to 218° C, dissolve most other common fibers including acetate, cotton, rayon, wool, nylon-6, acrylic, glass and metallic fibers.

Polyester solvents and solvent systems known to be and demonstrated as suitable for dye-stripping and selective dissolution of polyester, are listed in the following table showing acceptable dissolution conditions only.

Table I

|  |  | Approx. Ratios (where applicable) | Selective of polyester as against all common fibers* except |
|---|---|---|---|
| 1. Trichloroacetic acid, Dichloromethane | (25° C) | 20–100 80–0 | Acetate, nylon 6, nylon 66 |
| 2. Trichloroacetic acid 1,1,1 trichloroethane | (25° C) | 45–100 55–0 | Acetate, nylon 6, nylon 66 |
| 3. Trichloroacetic acid Water | (25° C) | 85–100 15–0 | Acetate, nylon 6, nylon 66 |
| 4. Trichlorophenol Phenol | (25° C) | 15–45 85–55 | Acetate, nylon 6, nylon 66 |
| 5. 1,1,2,2 Tetrachloroethane Phenol | (25° C) | 40–60 60–40 | Acetate, nylon 6, nylon 66 |
| 6. Meta-cresol | (25° C) | 100 | Acetate, nylon 6, nylon 66 |
| 7. Benzophenone | (210° C) | 100 | Acetate, polypropylene |
| 8. 1,1,1,3,3,3 - Hexafluoro-isopropanol | (25° C) | 100 | Acetate, acrylic, nylon 6, nylon 66 |
| 9. Diphenylmethane | (210° C) | 100 | Acetate (<⅛%), acrylic (~¼%) [Note: polypropylene melts but floats in separate phase] |
| 10. Biphenyl | (210° C) | 100 | None [Note: polypropylene melts but floats in separate phase] |
| 11. Acenaphthene | (210° C) | 100 | None [Note: polypropylene melts but floats in separate phase] |
| 12. Phenanthrene | (210° C) | 100 | Polypropylene |

*"Common Fibers" are: acetate, acrylic, cotton, wool, nylon 6, nylon 66, polypropylene, and rayon.

Suitable dye-stripping solvents include most of the so-called "polyester dye carriers". It is well known, for example, that most solutions of the following compounds will cause an increase in the diameter of the polyester fiber immersed therein: phenol, metacresol, tetrahydronaphthalene, orthophenylphenol, para-phenylphenol, and such compounds may be employed as either dye-stripping solvents or primary dissolution solvents or both. Other known solvents and solvent systems for polyester which may be employed for both There are inherent disadvantages in solvent systems containing phenol or cresol. Washing of the solvent from the precipitate is a somewhat difficult task requiring large volumes of alcohol or other suitable wash liquids.

The preliminary dye removal may be accomplished by any method of immersing or otherwise intimately contacting and agitating the fiber or fabric collection with the dye-stripping solvent, in any manner which produces a net reduction of final dye concentration in the fiber or fabric collection. Any one of the following methods may be used to accomplish the preliminary dye removal. Although the starting material is described as "fabric" or "fabric collection", it should be understood to include "fibers" as hereinafter defined.

1. Contacting a batch of fabric with a large amount of dye-stripping solvent, which quantity is large enough to dilute the dye concentration in the fabric to the desired level.
2. Contacting a batch of fabric with dye-stripping solvent. The dye-containing solvent is agitated if desired and continuously removed and replaced with fresh or relatively dye-free dye-stripping solvent, in sufficient quantity to reduce the fabric's dye concentration to the desired level.
3. Contacting a batch of fabric with fresh or relatively dye-free dye-stripping solvent, using agitation if desired, for a given batch contact time; thereafter removing substantially all of the dye-containing solvent and contacting the fabric with fresh or relatively dye-free dye-stripping solvent, with agitation if desired, for some period of contact time which may differ from the original or subsequent batch contact times; thereafter repeating as many times as desired such dye-stripping solvent addition, fabric contacting, and solvent removal, in order to obtain the desired degree of dye removal from the fabric. (This method is substantially equivalent to the laboratory Soxhlet extractor.)
4. Fabric or a fabric collection is continuously moved along a path or conduit in one direction while simultaneously being contacted with a dye-stripping solvent, which solvent is more or less continuously flowing in a direction opposite to the movement of the fabric. Fresh or relatively dye-free dye-stripping solvent is added in a manner which maintains a relatively continuous flow of the dye-stripping solvent, and the dye-containing dye-stripping solvent is more or less continuously removed at or near the place where the fabric or fabric collection is first contacted with the dye-stripping solvent.
5. Fabric or a fabric collection is successively contacted with dye-stripping solvent in a multiplicity of dye-stripping solvent contact stages, with said contact stages arranged in such a manner that each subsequent contact stage reduces the dye concentration in the fabric collection; especially a counter-current flow arrangement of contact stages, in which fresh or relatively dye-free dye-stripping solvent is added only to the final fabric contact stage, with a more or less equal amount of dye-containing dye-stripping solvent removed from the final stage and added to the dye-stripping solvent in the next-to-final contact stage, such counter-current flow replenishment continues for as many contact stages as are used, with the dye-laden dye-stripping solvent removed from the first fabric contact stage.

Of course, in these dye-stripping solvent contacting processes, the fabric or fabric collection may be added to the dye-stripping solvent, or the dye-stripping solvent may be added to the fabric or fabric collection. Similarly, of course, the fabric may be moved through dye-stripping solvent which is kept more or less in one place; or the fabric may be held more or less at one place while the dye-stripping solvent is moved into contact with and subsequently removed from the fabric or fabric collection; or, both the fabric and dye-stripping solvent may be moved simultaneously or alternately.

For efficient dye-stripping without polymer loss, the temperature of the dye-stripping solvent during the dye-stripping phase must be below the temperature at which there is significant dissolution of the polyester fibers. However, it is well known among textile dyeing and finishing experts that most efficient dye-stripping of polyester fibers will occur at the highest temperature practical because swelling of the crystalline lattice of the polyester is greatest at the higher temperatures. A significantly lower temperature will decrease swelling of the fiber, and at just above the freezing or solidification point of the solvent, there will be little or no dye-stripping. Preferred, therefore, is the highest temperature below which there is significant dissolution of the polyester.

Apparatus or equipment which may be used for the preliminary dye removal operation include tanks or vats, which may be agitated or not agitated, whether open top or covered or sealed to hold pressure or vacuum; bowl-type washing machines; pressure dyeing apparatus; centrifugal filters, with or without provisions for solvent rinsing or continuous or intermittent removal of fabric; continuously or intermittently moving conveyor belts passing through solvent-contacting zones; screw conveyor devices; and solvent spraying devices.

When the preliminary dye-stripping step is completed, and the dye-containing dye-stripping solvent is removed, the remaining wet fabric or collection of fabrics containing residual dye and solvent is contacted with sufficient additional relatively dye-free primary solvent under dissolution conditions for the polyester fibers. Of course, the residual dye-containing solvent-laden fabric may be added to the primary solvent, or the primary solvent may be added to the fabric. As previously mentioned, the additional primary dissolution solvent may or may not be the same solvent or solvent system as employed for dye-stripping; but it is preferable to use the same solvent or solvent system for process efficiency, simplicity, and economy. A recycling system is much preferred over a non-recycling system; and it might well be essential to the commercial feasibility of the process. Incompatible solvents or solvent systems would add to the complexity and cost of any such recycling.

When the polyester fibers have dissolved, any undissolved fabrics are removed from solution for discard or for subsequent use. The removal may be accomplished by any known physical separation procedures such as screening, centrifuging, decanting, filtration or any combination of these procedures.

Precipitation and separation may be accomplished by any convenient means, but it has been found that a shock quenching and solution spinning are preferred methods.

Shock quenching may be accomplished by subjecting the solution to a quenching medium, preferably in the form of a liquid which is preferably a solvent for the primary dissolution solvent. For example, a naphthalene solution may be shock quenched with acetone, benzene, 1-butanol, 2-butanone, dichloromethane, dimethylacetamide, dimethylformamide, ethanol, 2-ethyl-1-hexanol, hexane, methanol, N-methyl-2-pyrrolidone, tetrachloromethane, toluene, 1,1,1-trichloroethane, and xylene. Toluene, dimethyl formamide and acetone are preferred. Where the quenching medium is a solvent for the primary dissolution solvent, if the quenching solvent lowers the temperature of the naphthalene to a point where it would ordinarily solidify, the quenching medium will keep the naphthalene in liquid phase. In the case of naphthalene as primary dissolution solvent, polyester will precipitate from solution at a higher temperature than that at which naphthalene solidifies; and therefore quenching may be done with a non-solvent for naphthalene. Water, for example, has been successfully employed as a quenching material for the polyester solution.

If desired, the polyester solution may be spun directly to a fiber with simultaneous drawing during the fiber-forming process (if advantageous). The primary solvent may be either removed from the fiber during the fiber-forming process ("solution spinning"), or removed by washing the fiber with a suitable solvent some time after melt spinning is completed, and (where desirable) the primary solvent may even be removed after suitable drawing of the fiber. The solution spinning process is particularly advantageous, since the quenching medium provides simultaneous precipitation of polymer from solution, separation of primary solvent and dyes from the polyester, and formation of the polyester into fiber.

Referring now to the drawing, the figure is a flow sheet embracing a preferred embodiment of this invention. Polyester waste fabric 1 may include dyestuff, finish, knitting oils, etc.; and there may be contamination in the form of other fibers, including cotton, rayon, wool, nylon, acrylics, and the like. Scraps of paper or wire may also be in the feed stock. The waste fabric is loaded into washer-dissolver 2 which is an agitation-spin-dry device preferably having a wire-mesh covered rotatable bowl to prevent solid matter from being pumped out with liquids, this machine being similar to or identical with a conventional washing machine. Recycled naphthalene, at a temperature of about 165° C, is pumped from quench solvent flasher 11 into washer-dissolver 2, for the initial dye removal step. With agitation, more than half of the dye, knitting oil, finish, etc., is dissolved, and any moisture in the polyester is evaporated. The waste fabric load is spun out, and the spent naphthalene is recycled through flasher 3 to provide dye-free naphthalene for reuse in the dissolution step as the primary solvent. Residual dyestuff, permanent press resins, etc., are discarded. The relatively dye-free naphthalene is recycled at about 190°–210° C into washer-dissolver 2 causing immediate dissolution of the polyester at a polymer concentration of 20%. The solution of polyester in hot naphthalene is pumped out of washer-dissolver 2 through in-line filter 4 thereafter to be mixed in two-fluid nozzle 5 with the quenching medium which is dimethyl formamide (DMF) and dropped as a precipitate into slurry tank 6. Alternately, the two-fluid nozzle 5 may be bypassed and the quenching medium pumped directly into slurry tank 6 while the hot solution of polyester in naphthalene is sprayed into slurry tank 6.

Washer-dissolver 2, at this point contains only solid material which was not carried off in solution. This may include any paper, metal scraps, cotton, rayon, wool, nylon or acrylic fibers which were present in the waste fabric. This material is removed before a new load is placed in washer-dissolver 2.

The low temperature DMF injection at two-fluid nozzle 5 has caused a shock-quenching effect and thereby precipitated finely divided polyester powder which forms a suspension in the solution of DMF and naphthalene. Some residual dyestuff is also dissolved in the solution.

The polyester slurry is then fed to batch centrifugal filter 7 in which, during the first centrifuge cycle, a polyester filter cake is formed. The slurry feed is then interrupted and the filter cake sprayed with dichloromethane to rinse off the DMF, naphthalene and any residual dye. The white filter cake is then discharged to drying bin 8 where it is dried under mild heat conditions (above 40° C) to produce a crumblike polyester material. Intrinsic viscosity of the polyester crumb product is equal to the intrinsic viscosity of normal polyester spinning feed stock. No water or air is present in the drying bin, the vaporization of the dichloromethane generating its own continuous inert gas purge. Under such conditions, the crystallized material may then be fed directly from drying bin 8 to a bypass-vented extruder (not shown) and thereafter spun into filament.

In addition to the dye purge flasher 3, recovery systems for the naphthalene, the quench solvent, and the rinse solvent are integral with, although not essential to, this invention. Included in the material fed to centrifuge 7 is the DMF quenching medium, the dichloromethane rinse solvent, and naphthalene, the primary dissolution solvent for polyester. This combination of solvents is fed from centrifuge 7 to rinse solvent flasher 9 wherein dichloromethane is vaporized at about 40° C and fed to rinse solvent tank 10 for reuse. The DMF/naphthalene/residual dye solution is fed from rinse solvent flasher 9 to quench solvent flasher 11 where DMF is vaporized at about 153° C for use in quenching the polyester/naphthalene solution. The residue from quench solvent flasher 11 is fed to washer-dissolver 2 for use in the preliminary dye removal step. Washer-dissolver 2 and rinse solvent tank 10 are equipped with condensers 12 and 13 respectively, thereby to recover overhead losses.

A polyester is defined as synthetic linear condensation-type polymer whose repeating units contain the ester group,

these groups being integral members of the linear polymer chain. Polyesters known to be useful in the practice of this invention are those derived from aromatic dicarboxylic acids such as terephthalic acid and isophthalic acid and glycols such as ethylene glycol. Polyesters as used herein include copolymers containing repeating units of two or more different kinds such as copolyesteramide provided that at least two-thirds of the repeating units are the above-defined ester linkages

Representative examples include poly(ethylene terephthalate), poly(trimethylene terephthalate), poly(tetramethylene terephthalate), poly(ethyleneisophthalate), poly(octamethylene terephthalate), poly(decamethylene terephthalate), poly(pentamethylene isophthalate), poly(tetramethylene isophthalate), poly(hexamethylene isophthalate), poly(hexamethylene adipate), poly(pentamethylene adipate), poly(pentamethylene sebacate), poly(hexamethylene sebacate), poly(1,4-cyclohexylene terephthalate), poly(1,4-cyclohexylene sebacate), poly(ethylene terephthalate-co-sebacate), and poly(ethylene-co-tetramethylene terephthalate).

Unless otherwise indicated, the terms "collections of fibers" and "polyester fibers", as used herein to describe the starting material which is subjected to dye-stripping, separation and recovery in accordance with this invention, includes fibers, filaments, monofilaments, bands, ribbons, tubes, films and other linear constructions and includes yarns, threads, fabrics and other products into which these constructions may be incorporated as well as common impurities associated with such products, new or old.

We claim:
1. A process for separation, recovery and reuse in production, of polyester polymer from collections of fibers comprising a first polyester fiber component comprising polyester fibers selected from the group consisting of dyed fibers and undyed fibers and a second component consisting of fibers other than polyester fibers, said process comprising:
   1. stripping the dye from said dyed polyester fibers by contacting the collections with a dye-stripping solvent for the first polyester fiber component at a temperature below which the polyester dissolves and above which the crystalline lattice of the polyester fibers swell so as to release the dye;
   2. removing the excess of the dye-containing dye-stripping solvent which is not absorbed by the fabric;
   3. contacting the residual dye-containing dye-stripping solvent-laden fiber with sufficient addition of a primary dissolution solvent which is not a solvent for said second component to dissolve the polyester component, under selective dissolution conditions for the polyester component
   4. separating the dissolved polyester component from the undissolved second component; and
   5. precipitating the polyester out of solution.

2. The process of claim 1 wherein the dye-stripping solvent is compatible with the primary dissolution solvent.

3. The process of claim 1 wherein the dye-stripping solvent is the same as the primary dissolution solvent.

4. The process of claim 1 wherein the primary dissolution solvent is selected from the group consisting of: a mixture of benzyl alcohol and ethylene glycol; a mixture of dichloromethane and trichloroacetic acid; a mixture of naphthalene and benzyl alcohol; a mixture of trichloroacetic acid and 1,1,1 trichloroethane; a mixture of trichloroacetic acid and water; a mixture of trichlorophenol and phenol; a mixture of 1,1,2,2 tetrachloroethane and phenol; a mixture of 1,1,2 trichloro 1,2,2 trifluoroethane and 1,1,1,3,3,3 hexafluoro-isopropanol; para-chloroanisole; nitrobenzene; acetophenone; propylene carbonate; dimethyl sulfoxide; 2,6 xylenol; quinoline; naphthalene; meta-cresol; phenol; tetrahydronaphthalene; ortho-phenylphenol; para-phenylphenol; trifluoroacetic acid; ortho-chlorophenol; trichlorophenol; diphenyl; diphenyl ether; methyl naphthalene; benzophenone; diphenyl methane; para-dichlorobenzene; acenaphthene; and phenanthrene.

5. The process of claim 1 wherein the primary dissolution solvent is naphthalene.

6. The process of claim 1 wherein the primary dissolution solvent is naphthalene and the second component comprises fibers selected from the group consisting of cotton, rayon, nylon-6, nylon 66, acrylic, acetate, wool, glass and metallic fibers.

7. The process of claim 1 wherein the polyester is precipitated out of solution by quenching the solution with a quenching medium which is a solvent for the primary solvent.

8. The process of claim 7 wherein the quenching medium is selected from the group consisting of acetone, benzene, 1-butanol, 2-butanone, dichloromethane, dimethylacetamide, dimethylformamide, ethanol, 2-ethyl-1-hexanol, hexane, methanol, N-methyl-2-pyrrolidone; tetrachloromethane, toluene, 1,1,1-trichloroethane, and xylene.

9. The process of claim 7 wherein the quenching medium is selected from the group consisting of dimethyl formamide, acetone, and toluene.

10. The process of claim 1 wherein the second component comprises cotton fibers.

11. The process of claim 1 wherein the second component comprises polyamide fibers.

12. The process of claim 1 wherein the second component comprises wool fibers.

13. The process of claim 1 wherein the second component comprises acrylic fibers.

14. The process of claim 1 wherein the second component comprises a member of the group consisting of rayon fibers, acetate fibers and polypropylene fibers.

15. The process of claim 1 wherein the second component comprises a member of the group consisting of metal scraps and glass fibers.

16. The process of claim 1 wherein the primary dissolution solvent is a mixture of trichloroacetic acid and dichloromethane and the second component comprises fibers selected from the group consisting of acrylic, cotton, wool, polypropylene and rayon.

17. The process of claim 1 wherein the primary dissolution solvent is a mixture of trichloroacetic acid and 1,1,1 trichloroethane, and a second component comprises fibers selected from the group consisting of acrylic, cotton, wool, polypropylene and rayon.

18. The process of claim 1 wherein the primary dissolution solvent is a mixture of trichloroacetic acid and water, and the second component comprises fibers selected from the group consisting of acrylic, cotton, wool, polypropylene and rayon.

19. The process of claim 1 wherein the primary dissolution solvent is a mixture of trichlorophenol and phenol, and the second component comprises fibers selected from the group consisting of acrylic, cotton, wool, polypropylene and rayon.

20. The process of claim 1 wherein the primary dissolution solvent is a mixture of 1,1,2,2 tetrachloroethane and phenol and the second component comprises fibers selected from the group consisting of acrylic, cotton, wool, polypropylene and rayon.

21. The process of claim 1 wherein the primary dissolution solvent is benzophenone, and the second component comprises fibers selected from the group consisting of acrylic, cotton, wool, nylon 6, nylon 66 and rayon.

22. The process of claim 1 wherein the primary dissolution solvent is 1,1,1,3,3,3-hexafluoro-isopropanol and the second component comprises fibers selected from the group consisting of cotton, wool, polypropylene and rayon.

23. The process of claim 1 wherein the primary dissolution solvent is biphenyl, and the second component comprises fibers selected from the group consisting of acetate, acrylic, cotton, wool, nylon 6, nylon 66, and rayon.

24. The process of claim 1 wherein the primary dissolution solvent is acenaphthene and the second component comprises fibers selected from the group consisting of acetate, acrylic, cotton, wool, nylon 6, nylon 66, and rayon.

25. The process of claim 1 wherein the primary dissolution solvent is phenanthrene and the second component comprises fibers selected from the group consisting of acetate, acrylic, cotton, wool, nylon 6, nylon 66 and rayon.

26. The process of claim 1 wherein the primary dissolution solvent is diphenylmethane and the second component comprises fibers selected from the group consisting of cotton, nylon 6, nylon 66, rayon, wool, acetate and acrylic.

27. The process of claim 1 wherein the primary dissolution solvent is meta-cresol and the second component comprises fibers selected from the group consisting of acrylic, cotton, wool, polypropylene and rayon.

28. The process of claim 1 wherein the polyester polymer comprises polyethylene terephthalate.

29. The process of claim 7 wherein the quenching medium is water.

* * * * *